(No Model.)
H. BOWER.
PROCESS OF FACILITATING CHEMICAL REACTIONS.
No. 410,067. Patented Aug. 27, 1889.
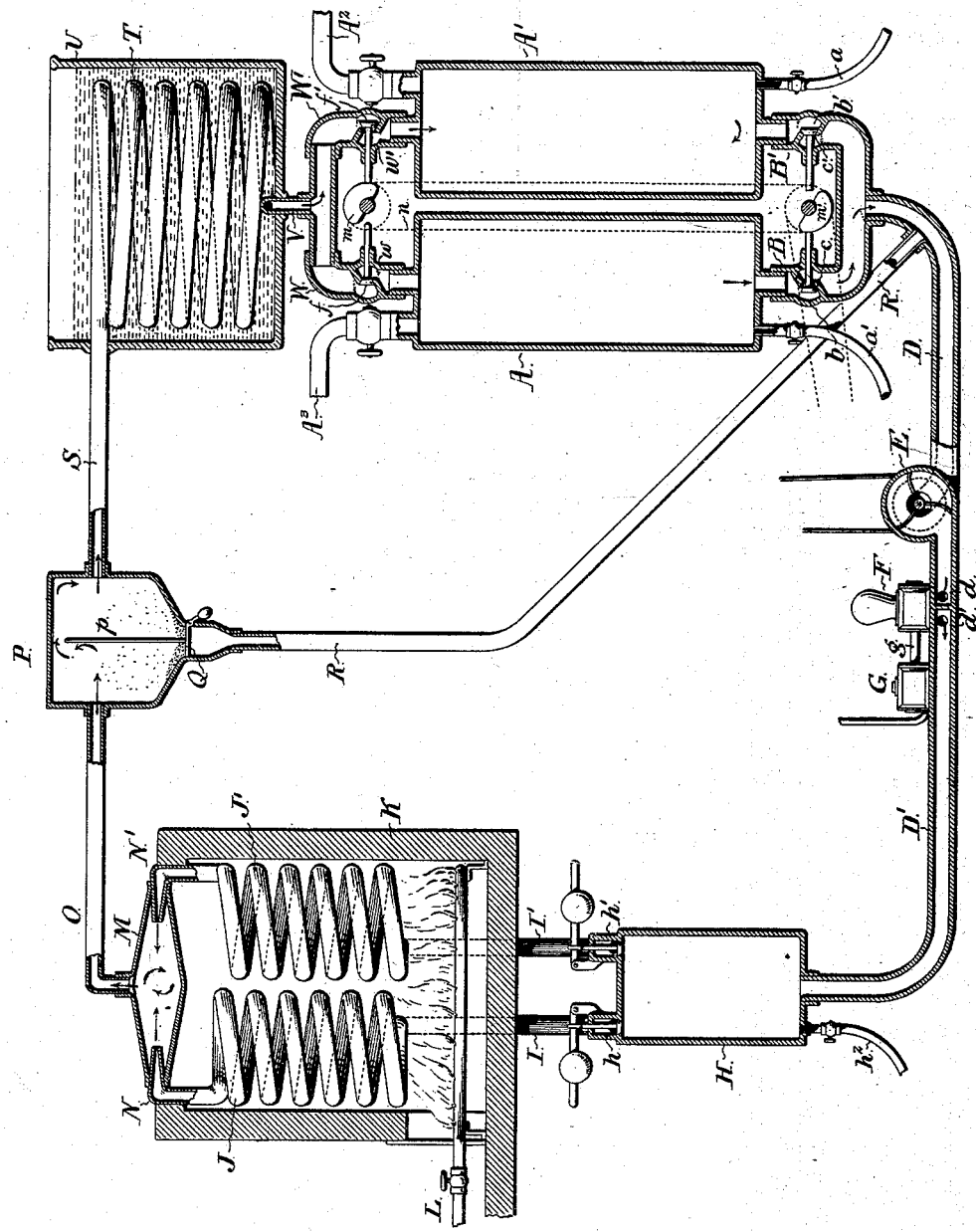

United States Patent Office.

HENRY BOWER, OF PHILADELPHIA, PENNSYLVANIA.

PROCESS OF FACILITATING CHEMICAL REACTIONS.

SPECIFICATION forming part of Letters Patent No. 410,067, dated August 27, 1889.

Application filed March 14, 1889. Serial No. 303,200. (No model.)

*To all whom it may concern:*

Be it known that I, HENRY BOWER, of the city of Philadelphia, State of Pennsylvania, have invented a certain new and useful Process for Facititating Chemical Reactions, whereof the following is a specification, the accompanying drawing illustrating a typical apparatus adapted for applying said process to one class of the reactions for which it is adapted.

Before proceeding to describe the process in detail, I deem it best to explain the theory upon which I believe it to be based, but I do this merely in order that those skilled in the art may more clearly appreciate its peculiar characteristics, and may consequently be enabled to better apply it in practical use. It must, therefore, be understood that I neither claim said theory as an essential part of my invention, nor do I wish it to be thought that the patentable novelty of my process depends upon the scientific accuracy of said theory.

It is a well-known principle in chemistry that many substances will when first evolved or disengaged from previous chemical combinations readily unite with other substances to which they are presented, and toward which they would be under other conditions chemically inert. A convenient nomenclature has applied the term "nascent state" to describe this condition. Thus, for instance, hydrogen will when in this state unite with nitrogen to form ammonia, but if the nascent condition has passed no length of exposure of the gases to one another, and so far as heretofore developed no method of manipulation or treatment and no form of apparatus has been devised which will cause them to combine in sufficient quantity for the commercial production of ammonia-gas. In theory this fact may be explained by considering that the molecules of the gases have their structure divided or altered when entering into combinations. Such division or alteration of the molecules may persist momentarily after the disengagement of the gas from combination, but by lapse of time and a continuing state of freedom the molecules may assume an individuality the tendency to maintain which is stronger than the inducement to enter into other combinations. While, therefore, in the nascent state which corresponds to the period before such individuality has been established the molecules may be open to readily form fresh combinations, they cease to be so by lapse of time and by what might be termed the "settling" of the substance into a definite and fixed condition.

I have discovered that the condition of a given substance which corresponds to the nascent state may be again brought about after the definite individuality of the substance has been established, and I have embodied my discovery in a process whereby the substances with which it deals are caused to retrograde, as it were, into a condition from which they have emerged, and in which they are open to form chemical combinations that would otherwise be beyond their power. I believe that the means by which my process acts is the actual mechanical disintegration of the whole or a portion of the several molecules, since this theory serves best to explain the behavior which is exhibited by various bodies when treated as hereinafter set forth; but, as before stated, I do not make the correctness of this theory in any manner essential to my claim.

Without attempting to enumerate all the various applications to which my discovery is adapted, a convenient classification (with types of the several classes) is as follows, and in thus classifying them I wish it to be understood that by the word "combination" I mean chemical union, and, further, that the bodies mentioned are under previously-known conditions chemically inert toward one another, or that they are, comparatively speaking, difficult to combine. In the former case my process is of course absolutely new as a means of effecting the given result, and in the latter case it is an improved means for carrying on existing processes. The classes are as follows: first, the combination of two gases—as, for example, hydrogen and nitrogen—for the commercial manufacture of ammonia; second, the combination resulting from the use of a gas and one or more solid substances—as, for example, chloride of sodium and atmospheric air—for the production of chlorine gas; third, the combination resulting from the use of a vapor and one or more solid substances—as, for example, chloride of sodium and steam—for the production of hydrochloric acid; fourth, the combination of two or more liquids—as, for example, different products of petroleum—to form intermediate grades of such products, or the production of fatty acids and glycerine by the action of water upon neutral fats; fifth, the combination resulting from the use of a salt in solution and a substance in suspension—as, for example, a solution of sulphate of soda and milk or cream of caustic lime—to form caustic soda; sixth, the combination of a gas in solution and a solid—as, for example, the treatment of wood by means of sulphurous acid in solution in water—to disintegrate, purify, and bleach the material for paper-manufacture; seventh, the combination resulting from the use of a gas, a solid, and a liquid—as, for example, the action of finely-divided carbon or coal upon the gas already produced from coal, with or without the use of a liquid hydrocarbon—for the production of illuminating-gas; eighth, the combination resulting from the use of a solid and a gas—as, for example, oxide of iron and atmospheric air—for the production of a higher oxide of iron or the converse of this process—viz., the action of carbon, hydrogen, or other reducing agents upon metallic oxides, such as alumina, producing aluminium by the gradual reduction of the oxide.

Other similar applications may suggest themselves, and as I believe that my discovery is a fundamental one and widely applicable to chemical reactions I do not wish to be understood as restricting my claim to the above-specified instances. The same are given as typical of several classes of substances to which my discovery is applicable, and the classes are obviously only distinguished by reference to the physical condition of the substance mentioned.

The characteristic mode of operation of my process is as follows: I cause two opposing jets of the substances to be combined to be forced together in a proper receptacle under pressure, and when the substances themselves are not capable of producing by merely their joint impact and attrition such a disintegration as is essential to the success of the process, I commingle with them in such form as to be freely carried into the jets finely-divided solid material of such character as to take no part in the chemical reaction, but acting mechanically to produce impact and attrition. I find also that the use of heat, or of cold, or of changes of temperature, is a valuable adjunct to the process, and under some circumstances I avail myself thereof.

In the accompanying drawing I have shown in vertical section an apparatus adapted to operate in connection with the first class of reactions—viz., combination between two gases, as, for instance, hydrogen and nitrogen to form ammonia.

A A' represent two strong closed vessels of metal.

At the top of the vessel A is a charging-pipe $A^3$, controlled by a suitable stop-cock and a similarly-controlled discharge-pipe $a'$ at the bottom. The vessel A' has similar pipes $A^2$ and $a$, respectively. From the lower end of the vessels outlet-pipes B B' lead through the valve-chambers $b\ b'$ to a common pipe or duct D. This duct communicates with the inlet of a blast-fan E, whose discharge leads to the inlet $d$ of a steam force-pump F, actuated by the piston-rod $g$ of a steam-cylinder G. The pump discharges at $d'$ into a duct D', which terminates in a closed chamber H. This chamber, which I term the "accumulator," has as its bottom a discharge-pipe $h^2$ and at its top two outlet-pipes I I', which are controlled by weighted valves $h\ h'$, respectively. The pipes I I' lead into the interior of a furnace K, where they are disposed in coils J J', respectively, and beneath said coils is a gas-burner L, or other suitable heating apparatus. Above the furnace is a small strong vessel or compartment M, preferably shaped like a double cone, as shown, and into the end of said vessel nozzles N N' lead or project, said nozzles being the outlets from the coils J J', respectively. Said nozzles are placed directly opposite to one another, preferably only a short distance apart. From the the vessel M an outlet-pipe O leads to a dust-separating chamber P, having one or more screens $p$ arranged in the well-known manner for the separation of dust. The bottom of the dust-chamber converges, as shown, to an opening provided with a damper Q, whence a pipe R leads to the duct D. The gas-outlet pipe S of the dust-chamber leads to a coil T, placed within a cooling-tank U, and the other end of said coil communicates by means of a pipe V with the two branches W W', which lead through suitable valve-chambers $w\ w'$, respectively, to the vessels A A'.

Within the valve-chamber $b\ b'$ and $w\ w'$ are puppet-valves $c\ c'$ and $f f'$, respectively, whose stems are controlled by rotating cams $m\ m'$, simultaneously actuated by means of an endless belt $n$. These cams are so arranged that when one of them opens the inlet-valve $f$ or $f'$ of one of the vessels A or A' the other cam will open the outlet-valve $c'$ or $c$ of the other vessel, whereupon the pressure within the vessels and pipes will close each of the other valves.

I find that the above arrangement is a convenient method for controlling chambers which are to be used alternately, as will now be described, such alternating use enabling me to carry on the process as practically a continuous one.

Assuming now that the chamber A has been charged with a mixture of hydrogen and nitrogen gases from any convenient source of supply, and in the proper proportions for conversion into ammonia, the outlet-valve $c$ of that of said chamber is open and the inlet-valve $f$ is closed, the valves of the other chamber A' assuming, of course, the converse position. I then introduce into the duct D (either by means of the pipe R or in any other convenient manner) a quantity of very finely-divided graphite or plumbago, and the fan E being actuated a powerful blast of the mixed gases, carrying in suspension the particles of graphite, is thrown into the inlet of the force-pump F, and thence by the action of the pump is forced into the accumulator H. The valves h h' are weighted to correspond with any desired degree of pressure within the accumulator, and I prefer using a very high one—such, for instance, as two hundred pounds or more to the inch, which is maintained during the operation. When the required pressure is reached the valves h h' open automatically and the mixed gases pass through the heating-coils J J', where they are highly heated. They are then discharged by the nozzles N N' in opposing currents of great force, and after momentary submission to the effects of attrition within the vessel M they pass out into the dust-chamber P, where the finely-divided graphite is in a large measure thrown down and accumulates at the bottom of the chamber, to be again fed by the pipe R into the duct D, where it renews its circuit through the apparatus. The gases, in a more or less combined state, pass out through the pipe S, and are cooled by means of the coil T, whence they pass by means of the pipe W' into the vessel A'. When the vessel A has been substantially exhausted of its contents, the position of the valves $ff'$ and $c\ c'$ is reversed, the chamber A' now becoming the supply-chamber and the chamber A the receiving-chamber. The circuit of the gases through the apparatus is continuously maintained until, by the repeated action of the opposing jets, a chemical union results in the form of ammonia-gas, which is then drawn off from the receiving-vessel A or A' and absorbed by any convenient vehicle after the manner usually practiced in the manufacture of ammonia-gas, water of ammonia, or ammoniacal salts.

For the commercial manufacture of ammonia it is of course necessary that the above process should be conducted on a large scale. Thus the chambers A A' should each have an interior capacity of, say, four thousand cubic feet. It will therefore be understood that the relative size of the parts in said drawings is not in the proper proportion, the intention being merely to indicate the general nature of the apparatus.

The purpose of introducing the powdered graphite is to supply a solid agent to act upon the molecules of the gases by attrition. This I believe to be necessary for effecting a combination between the two gases, since the mere impact of the gaseous particles upon one another is not sufficient under conditions which I have been able to attain for the necessary disintegration of the molecules. I prefer to use plumbago or graphite, because it is not only easily carried along by the current of the gas, but it acts as a lubricant upon the fan and working portions of the pump instead of wearing them out, as would be the case were the powder of a gritty nature; but I wish it to be understood that I do not limit my claim to the use of any particular solid material, it being only essential that it should be of such a nature as not to injuriously affect the process by chemical reaction of its own. Thus, for instance, I use finely-divided silica in some cases where plumbago would be objectionable.

I have now described a typical instance of the use of my process when applied to produce combination between two gases. If, however, the process is to be used with other substances, the apparatus may be modified accordingly. Thus, in the classes above referred to, where solids and liquids are to be treated, I dispense with the fan, the dust-chamber, and the dust-feeding devices. Under some circumstances the use of heat is dispensed with, and cold is substituted. Again, in other cases, (see Class 8,) finely-divided solid material is used, not only for the benefit of the attrition which its particles will yield, but because the solid particles themselves are to be acted upon and enter into the chemical combination. Therefore under these different conditions it must be understood that the apparatus may be varied, so as to produce the needed results without in any way affecting the mechanical principle upon which the process depends for its success, and which principle is embodied in the treatment by continued impact and attrition of opposing currents under such pressure and variations of temperatures as the different industrial applications may demand.

I am aware that the use of two opposing jets as a means of grinding or pulverizing substances carried by said jets is not new, and I do not claim the same, my discovery being the fact that chemical reaction may be rendered possible or facilitated by the molecular disturbance which results from such impact and attrition.

Having thus described my discovery and the application thereof to industrial processes, I claim—

The hereinbefore-described process of mechanically facilitating chemical reactions, which consists in subjecting two or more substances to be combined to the effect of impact and attrition from opposing jets, substantially as set forth, and with or without the use of a finely-divided solid agent for intensifying such impact and attrition.

HENRY BOWER.

Witnesses:
HENRY N. PAUL, Jr.,
E. R. REESE.